(12) United States Patent
Hauk

(10) Patent No.: US 10,436,100 B2
(45) Date of Patent: Oct. 8, 2019

(54) THERMOSTAT VALVE FOR A COOLANT CYCLE

(71) Applicant: ILLINOIS TOOL WORKS INC., Glenview, IL (US)

(72) Inventor: Torsten Hauk, Neustadt (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 112 days.

(21) Appl. No.: 14/911,620

(22) PCT Filed: Jul. 29, 2014

(86) PCT No.: PCT/US2014/048565
§ 371 (c)(1),
(2) Date: Feb. 11, 2016

(87) PCT Pub. No.: WO2015/041748
PCT Pub. Date: Mar. 26, 2015

(65) Prior Publication Data
US 2016/0195001 A1    Jul. 7, 2016

(30) Foreign Application Priority Data

Sep. 18, 2013   (DE) .................. 10 2013 110 260

(51) Int. Cl.
*F01P 7/16* (2006.01)
*F01L 7/02* (2006.01)
(Continued)

(52) U.S. Cl.
CPC .............. *F01P 7/161* (2013.01); *F01L 7/021* (2013.01); *F16K 31/002* (2013.01); *F16K 31/06* (2013.01); *F16K 31/523* (2013.01); *F01P 7/167* (2013.01)

(58) Field of Classification Search
CPC . F01P 7/161; F01P 7/16; F16K 31/062; F16K 31/523; F16K 17/366;
(Continued)

(56) References Cited

U.S. PATENT DOCUMENTS 3,651,903 A * 3/1972 Butler ................. F16F 15/16
16/82
4,555,910 A * 12/1985 Sturges ............... B60H 1/3205
236/35
(Continued)

FOREIGN PATENT DOCUMENTS

CN         1664423      9/2005
CN         101484738    7/2009
(Continued)

OTHER PUBLICATIONS

English Translation of FR2978518A1.*
(Continued)

*Primary Examiner* — Christopher R Zerphey
*Assistant Examiner* — Schyler S Sanks
(74) *Attorney, Agent, or Firm* — Thompson Hine LLP

(57) ABSTRACT

A thermostat valve for a coolant circuit includes a housing with a plurality of coolant connectors, and at least one hollow valve element mounted in the housing for rotation about a rotational axis. At least one opening in the circumferential face, the opening selectively connectable to one or more of the coolant connectors by way of rotation. A drive rotates the valve element and includes at least one actuator which can be switched between a first switching state for rotation in a first rotational direction and a second switching state for rotation in a second rotational direction. A two-point control device actuates the actuator in such a way that, if a setpoint value is exceeded and if the setpoint value is undershot, the actuator is switched from one switching state
(Continued)

Figure 1:
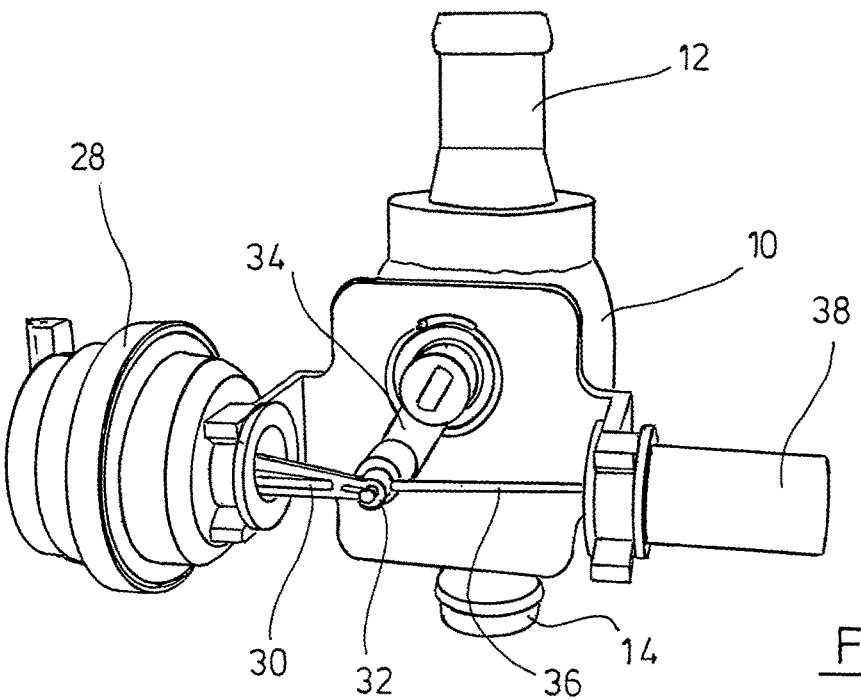

to the other. A damping mechanism damps the rotational movement of the at least one valve element.

5 Claims, 2 Drawing Sheets

(51) Int. Cl.
*F16K 31/52* (2006.01)
*F16K 31/00* (2006.01)
*F16K 31/06* (2006.01)

(58) Field of Classification Search
CPC ...... F16K 17/363; F16K 31/563; F16K 31/06; F16K 47/00; F16K 47/023
USPC .......................................... 123/41.1; 236/34.5
See application file for complete search history.

(56) References Cited

U.S. PATENT DOCUMENTS

2012/0085952 A1* 4/2012 Hauk .................... F16K 5/0647
251/129.11
2013/0020237 A1* 1/2013 Wilt .................... A61M 1/1037
210/85
2014/0190427 A1* 7/2014 Nagahama ................ F01P 7/16
123/41.1

FOREIGN PATENT DOCUMENTS

| | | | |
|---|---|---|---|
| CN | 101535695 | 9/2009 | |
| CN | 102203483 | 9/2011 | |
| DE | 35 16 142 A1 | 12/1985 | |
| DE | 102009004157 | 4/2010 | |
| DE | 10 2010 008740 | 8/2011 | |
| EP | 1 529 937 A1 | 5/2005 | |
| FR | 2959776 A1 * | 11/2011 | ......... F02D 41/0077 |
| FR | 2978518 A1 * | 2/2013 | ......... F16K 31/1655 |
| JP | WO 2013042588 A1 * | 3/2013 | ................ F01P 7/16 |

OTHER PUBLICATIONS

Microchip, Temperature Sensor Design Guide, 2004.*
English translation of FR-2959776-A1.*
PCT, International Search Report and Written Opinion of the International Searching Authority, International Application No. PCT/US2014/048565; dated Oct. 27, 2014, 10 pages.

* cited by examiner

THERMOSTAT VALVE FOR A COOLANT CYCLE

The invention relates to a thermostat valve for a coolant circuit, in particular of an automobile, comprising a housing with a plurality of coolant connectors, and comprising at least one hollow valve element which is mounted in the housing such that it can be rotated about a rotational axis, the at least one valve element having at least one opening which is formed in the region of its circumferential face, it being possible for the at least one opening to be connected selectively to one or more of the coolant connectors of the housing by way of rotation of the at least one valve element, and drive means being provided, by way of which the at least one valve element can be rotated about the rotational axis.

Thermostat valves which set one or more coolant circuits depending on operational parameters are used to control and regulate the coolant systems in internal combustion engines or else electrically operated power machines of automobiles. For example, thermostat valves which are driven by electric motor and are capable of controlling one or more coolant paths are used. Said thermostat valves use, for example, rotatable cylindrical or spherical segment-shaped hollow rolls, what are known as rotary slides, as valve elements.

The valve element is mounted in the housing of the thermostat valve such that it can be rotated as a rule between two end positions. It is often desirable for it also to be possible to move to a multiplicity of intermediate positions between said end positions with the valve elements. This is possible, for example, by way of valve elements which are driven by electric motor. They can realize rotary angular positions of the valve elements which are predefined in a manner which is substantially accurate to within one degree.

Electric motor drive means of this type are expensive, however. Less expensive drive means comprise, for example, vacuum actuators which can act on the valve element via a pressure-actuated diaphragm and a push rod which is operatively connected to the diaphragm, in such a way that an axial movement of the push rod which is triggered by the pressure-actuated diaphragm is converted into a rotational movement of the valve element. Vacuum actuators, however, cannot be actuated in a continuously variable manner like electric motor drives, but rather as a rule can realize only two switching positions, namely a first switching state, in which the valve element is rotated in a first rotational direction, and a second switching state, in which the valve element is rotated in a second rotational direction.

In order for it to be possible, nevertheless, to move to variable intermediate positions between the end positions of the valve element by way of a vacuum actuator, it has been proposed in DE 10 2010 008 740 A1 to operatively connect the vacuum actuator to a pressure converter, with the result that the vacuum actuator can be loaded with a vacuum which can be adjusted in an infinitely variable manner. Although largely any desired rotational positions of the valve element can be realized as a result, this is structurally complicated.

Proceeding from the described prior art, the invention is based on the object of providing a thermostat valve of the type mentioned at the outset, by way of which thermostat valve substantially any desired rotational positions of the valve element can be moved to in a structurally simple and inexpensive way.

The invention achieves the object by way of the subject matter of claim 1. Advantageous refinements are found in the dependent claims, the description and the figures.

For a thermostat valve of the type mentioned at the outset, the invention achieves the object by virtue of the fact that the drive means comprise at least one actuator which can be switched between two switching states, the at least one valve element being rotated about the rotational axis in a first rotational direction in a first switching state and in a second rotational direction in a second switching state, and that a two-point control device is provided which, depending on the setpoint value which is predefined for it, actuates the at least one actuator in such a way that, if the setpoint value is exceeded firstly and if the setpoint value is undershot secondly, said actuator is switched from its respective switching state into its respective other switching state, damping means being provided, furthermore, which damp the rotational movement of the at least one valve element.

The thermostat valve is provided for use in a coolant circuit of an engine of an automobile. The valve element which is provided according to the invention forms what is known as a rotary slide. It can be, for example, of hollow-cylindrical or hollow-spherical configuration. Accordingly, the valve element can have a spherical or spherical segment-shaped or cylindrical or cylindrical segment-shaped circumferential face. One or more openings which are delimited, in particular, by the circumferential face are formed in a manner known per se in the circumferential face. The openings can selectively release or close different coolant connectors of the housing and, as a result, connect them to one another or disconnect them from one another. In a manner which is known per se, the coolant connectors of the housing form passages to different coolant lines of a coolant system of an engine. It goes without saying that it is also possible that the thermostat valve according to the invention has a plurality of valve elements of this type which are mounted in the housing, for example, next to one another and such that they can be rotated on a common rotary shaft. In this case, the valve elements can switch coolant connectors of the housing which lie next to one another along the rotational axis, that is to say connect them to one another or disconnect them from one another.

According to the invention, the drive means comprise at least one actuator which can be switched between two switching states, the at least one valve element being rotated about the rotational axis in a first rotational direction in the first switching state and being rotated about the rotational axis in the other rotational direction in the second switching state. The actuator is therefore not an actuating variable which can be adjusted in a continuously variable manner, but rather can be switched, in particular, only between two switching states and is therefore particularly inexpensive. In order for it to be possible, nevertheless, to move to substantially any desired rotational positions by way of the valve element, a two-point control device is provided according to the invention which carries out a non-continuous two-point control operation. A setpoint value is predefined to the two-point control device, for example by a control device of an automobile. The two-point control device compares said setpoint value with an actual value which is measured, for example, by way of suitable sensors. If the actual value lies below the setpoint value by a predefined limiting value, the two-point control device sets the actuator into a first switching state, in which the at least one valve element is rotated in a first rotational direction and the measured actual value rises. As soon as the actual value exceeds the predefined setpoint value by a predefined limiting value, the actuator is switched over into its second switching state, with the result that the valve element is rotated in the opposite rotational direction. The actual value then drops. As soon as the actual value again undershoots the predefined setpoint value by the predefined limiting value, the actuator is again switched over into its first switching state, with the result that the valve element is rotated again in its first rotational direction, etc.

Inexpensive actuators which are used according to the invention, for example vacuum actuators, are distinguished by a very rapid switchover which is actually often too rapid for the two-point control according to the invention. In principle, rapid switching of this type of the actuator or rapid change of the actual value leads to switching having to be carried out correspondingly often. This in turn is disadvantageous, since it can lead to increased wear, undesired pressure spikes, etc. Damping means are therefore provided according to the invention which damp the rotational movement of the at least one valve element. The valve element movement is therefore braked deliberately, in order to avoid excessively rapid switching changes of the actuator. For instance, switching of the actuator at intervals of merely 500 ms can occur without the damping means. By way of suitable damping means, the time intervals between switching operations can be extended to several seconds, for example approximately 10 s. Inexpensive actuators, such as vacuum actuators, can therefore also be used for the two-point control according to the invention.

The actual value of the two-point control according to the invention therefore oscillates in a damped manner around the setpoint value. Quasi-proportional control of the rotational position of the valve element in the housing of the thermostat takes place. Here, essentially any desired rotational positions of the valve element in the housing can be set in a variable manner. In particular, substantially any desired intermediate positions between the end positions of the rotational movement of the valve element can be realized. However, it is also possible that the control is always carried out to defined rotational positions which, for example, correspond to an opening cross section of a coolant connector of the housing of 0%, 25%, 50%, 75% or 100%. Here, the thermostat valve according to the invention is structurally simple and inexpensive.

The setpoint value can be a setpoint value for a rotational position of the at least one valve element or a setpoint value which characterizes such a rotational position of the at least one valve element or a setpoint value for a coolant temperature of a coolant of the coolant circuit, which coolant is controlled by way of the thermostat valve, or a setpoint value for a coolant volumetric flow which is guided through the thermostat valve. The respective intervention limits for the two-point control are then likewise predefined by way of corresponding upper and lower limiting values around the setpoint value. If the setpoint value is a setpoint value for a coolant volumetric flow which is guided through the thermostat valve, the setpoint value can be, for example, an opening cross section of a coolant connector, which opening cross section is released by way of the valve element.

In particular, vacuum actuators or electromagnets may be suitable as inexpensive actuators. A vacuum actuator can interact in a manner which is known per se, for example, via a pressure-actuated diaphragm with a first end of a push rod which acts eccentrically with its opposite second end on the at least one valve element and thus rotates the latter during an axial movement of the push rod, which axial movement is brought about by way of a pressure change in the vacuum actuator. An electromagnet can correspondingly act magnetically on the valve element or an actuating element which is connected to the valve element, in order to rotate the valve element.

The damping means according to the invention can comprise a displacement damper and/or circumferentially driven inertia means and/or a retarding damper and/or a frictional damper. For example, hydraulic or pneumatic dampers may be suitable as displacement dampers. For example, silicone dampers are suitable. However, a circumferentially driven inertia means which runs up with the rotational movement is also possible. For example, friction couplings may be suitable as frictional dampers and, for example, what are known as anchor retarders may be suitable as retarding dampers.

Furthermore, it can be provided that the limiting values which are predefined in each case for switching the at least one actuator if the setpoint value is exceeded or undershot are selected in such a way that the two-point control which is carried out by way of the according to the invention is effected with hysteresis. The hysteresis prevents excessively rapid switching changes, by the limiting values for the switchover of the actuator being selected in each case at a defined distance from the setpoint value. The oscillation amplitude about the setpoint value rises, while the oscillation frequency falls. For example, limiting values can be predefined which differ from the setpoint value by up to 5%. For example, in the case of a setpoint value for the rotational position of the valve element or a setpoint value which characterizes such a rotational position, limiting values for the respective switchover after exceeding or undershooting of the setpoint value can be selected in each case in such a way that they permit a rotation of the valve element by, for example, at least 3° and at most 8° as a deviation with respect to the setpoint value, before the actuator is switched over. The hysteresis can also be selected, for example, in relation to an opening cross section of a defined coolant connector, which opening cross section is released by way of the valve element. For example, an opening cross section of ±5% about a setpoint value can thus be permitted for the opening cross section, without switching of the actuator taking place.

Figure 2:
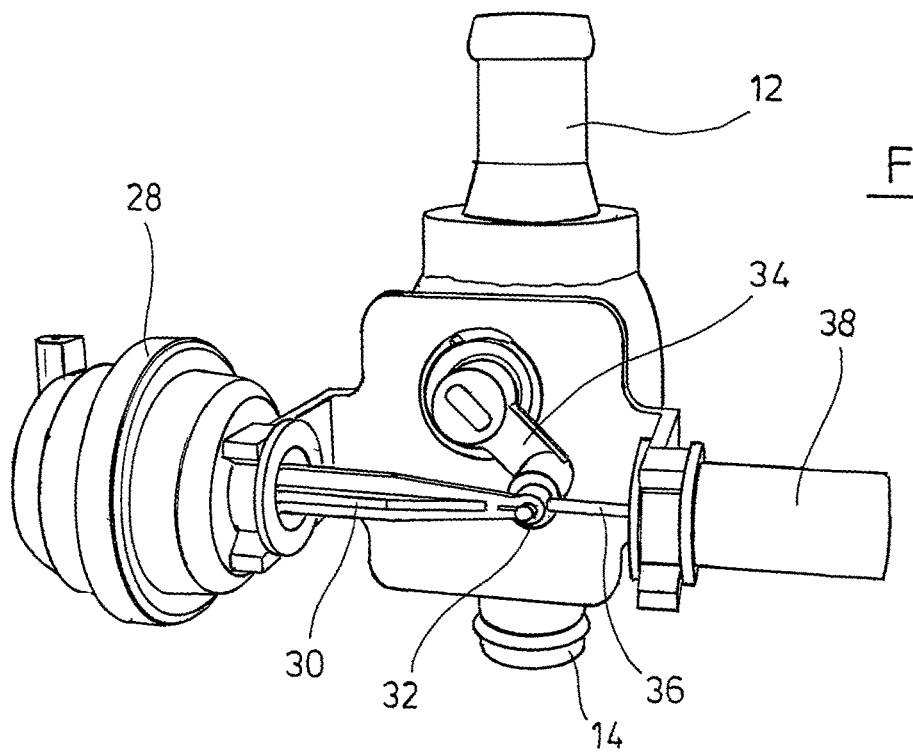
Figure 3:
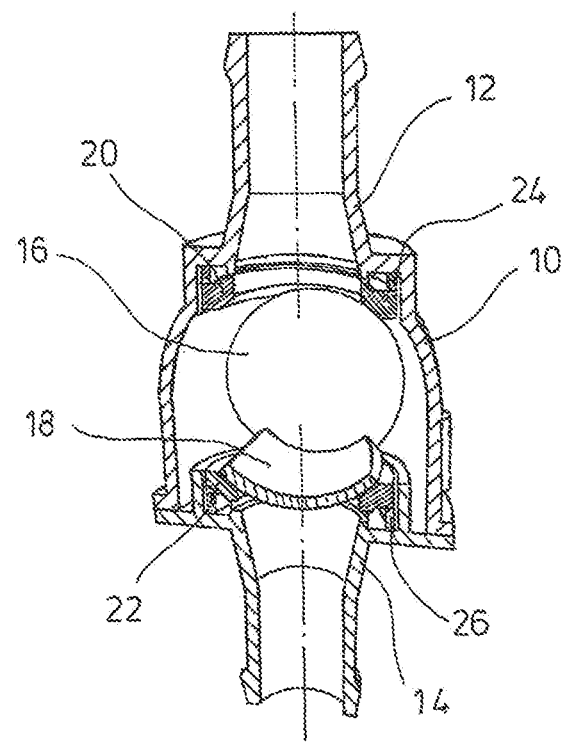
Figure 4:
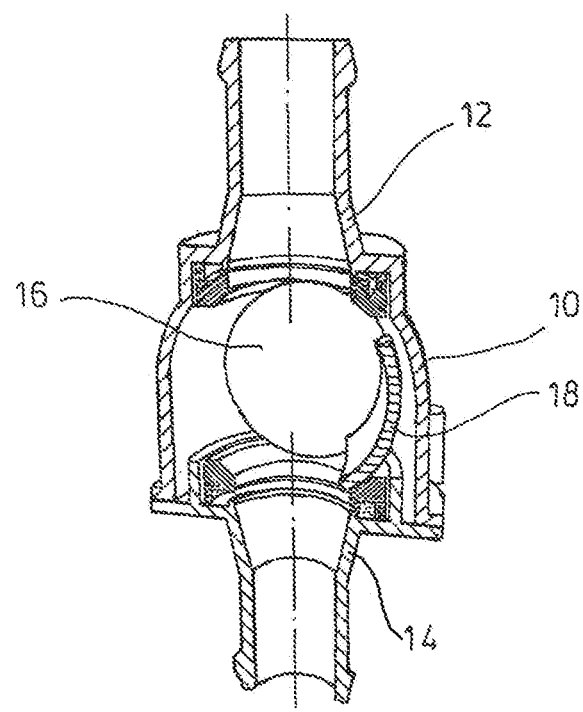

In the following text, one exemplary embodiment of the invention will be explained in greater detail using figures, in which, diagrammatically:

FIG. 1 shows a thermostat valve according to the invention in a first operating state, in a perspective view, FIG. 2 shows the illustration from FIG. 1 in a second operating state, FIG. 3 shows a cross section through the illustration from FIG. 1, and FIG. 4 shows a cross section through the illustration from FIG. 2.

Insofar as nothing else is specified, identical designations denote identical objects in the figures. The thermostat valve according to the invention which is shown in the figures for an engine of an automobile comprises a housing 10 with, in the example which is shown, a first cooling liquid connector 12 to a first cooling liquid line (not shown) of the cooling liquid system of the engine and a second cooling liquid connector 14 to a second cooling liquid line (likewise not shown) of the cooling liquid system of the engine. FIGS. 3 and 4 show a third cooling liquid connector at the designation 16. Moreover, it goes without saying that the housing 10 can have further cooling liquid connectors. At least one hollow-spherical valve element is mounted in the housing 10 such that it can be rotated about a rotational axis. FIGS. 3 and 4 show only a section 18 of the valve element 18 for illustrative reasons. The valve element 18 has at least one opening which is formed in the region of its circumferential face and can be brought selectively into congruence with one or more of the cooling liquid connectors 12, 14, 16 of the housing 10 by way of rotation of the valve element 18, with the result that, for example, the cooling liquid connectors 12 and 14 can selectively be connected to one another, as shown in FIG. 4, or can be disconnected from one another, as shown in FIG. 3. Furthermore, it can be seen in FIGS. 3 and 4 that the cooling liquid connectors 12 and 14 are surrounded in each case by annular sealing means 20, 22 which, in the example which is shown, are prestressed in the direction of the facing circumferential face of the valve element 18 by way of elastic prestressing means 24, 26. This construction of a thermostat valve is known per se.

The drive means for rotating the valve element 18 in the housing 10 are to be explained using FIGS. 1 and 2. In the present case, as actuator, the drive means comprise a negative pressure or vacuum actuator 28 which is operatively connected, for example, via a pressure diaphragm to a push rod 30. The push rod 30 is mounted rotatably by way of a bearing section 32 on a rotary lever 34 which rotates the valve element 18 about a rotational axis. As can be seen in FIG. 1 in comparison with FIG. 2, a movement of the push rod 30 in the longitudinal direction, which movement is brought about by way of a pressure change in the vacuum actuator 28 and an actuation induced thereby of the pressure diaphragm, brings about pivoting of the rotary lever 34 and therefore rotation of the valve element 18 between the rotational positions which are shown in FIGS. 3 and 4. On the side which lies opposite the vacuum actuator 28, a plunger rod 36 acts on the rotary lever 34, which plunger rod 36 is guided in a damping cylinder 38 by way of its end which lies opposite the rotary lever 34. At its end which is guided in the damping cylinder 38, the plunger rod 36 has a plunger which is guided in the damping cylinder 38 in the case of a movement of the plunger rod 36 between the operating states which are shown in FIG. 1 and FIG. 2 in the axial direction in the damping cylinder 38, as a result of which the movement of the plunger rod 36 and therefore of the push rod 30 and therefore in turn of the valve element 18 is damped. The damping cylinder 38 forms a pneumatic dampener in conjunction with the plunger rod 36 and the corresponding plunger, which pneumatic damper brakes the rotational movement of the valve element.

Moreover, the thermostat valve according to the invention comprises a two-point control device (not shown). As can be seen, the vacuum actuator 28 can be switched only between two switching states, namely a first switching state, in which the valve element is rotated in a first rotational direction, and a second switching state, in which the valve element is rotated in a second rotational direction. Both rotational directions are delimited by way of corresponding end positions of the valve element. The two-point control device receives a predefined setpoint value and actuates the vacuum actuator 28 in such a way that, if the predefined setpoint value is undershot by an actual value which is measured by means of suitable sensors by a predefined limiting value, the vacuum actuator 28 is actuated in such a way that the actual value rises until it exceeds the predefined setpoint value by a predefined limiting value. In the case of exceeding by the predefined limiting value, the vacuum actuator 28 is switched over into its other switching state, with the result that the actual value falls again until it reaches the limiting value for undershooting the setpoint value. Subsequently, a switchover of the vacuum actuator 28 takes place again, etc. As a result, the valve element 18 oscillates about the respectively predefined setpoint value. It is possible in this way to move to substantially any desired intermediate positions between the end rotational positions of the valve element 18. Here, the pneumatic damping ensures that the intervals between the switching operations of the vacuum actuator 28 do not become too small. For example, switching times of approximately 10 s can be realized by way of a suitable design of the pneumatic damping.

The invention claimed is:

1. A thermostat valve for a coolant circuit, comprising:
 a housing with a plurality of coolant connectors, and wherein the coolant connectors connect the housing to the coolant circuit;
 at least one hollow valve element mounted in the housing for rotation about a rotational axis, the at least one valve element having at least one opening on a circumferential face of the valve element, wherein the at least one opening is selectively connectable to one or more of the coolant connectors of the housing by way of rotation of the at least one valve element in order to control flow along the coolant circuit,
 a drive mechanism for rotating the at least one valve element about the rotational axis, wherein the drive mechanism includes at least one pneumatic actuator switchable only between a first switching state to rotate the at least one valve element in a first rotational direction toward a first end position and a second switching state to rotate the at least one valve element in a second rotation direction toward a second end position, the second rotational direction being opposite the first rotational direction,
 a damper connected to damp the rotational movement of the hollow valve element by the drive mechanism;
 a two-point control device is provided to enable the at least one valve element to be maintained substantially at one intermediate position from among multiple intermediate positions between the first end position and the second end position by repeatedly switching the at least one actuator between the first switching state and the second switching state based upon a predefined setpoint value for the two-point control device, wherein the two-point control device actuates the at least one actuator in such a way that, if the predefined setpoint value is exceeded, said at least one actuator is switched from the first switching state into the second switching state and, if the predefined setpoint value is undershot, said at least one actuator is switched from the second switching state into the first switching state, resulting in an oscillating rotational movement of the at least one valve element about the one intermediate position without rotating the at least one valve element to either the first end position or the second end position,
 wherein the damper damps the rotational movement of the at least one valve element in order to increase time intervals between switching operations of the pneumatic actuator between the first and second switching states, as compared to switching that would occur in absence of the damper, so as to facilitate maintaining the hollow valve element substantially at the one intermediate position.

2. The thermostat valve according to claim 1, wherein the predefined setpoint value is (i) a setpoint value for a desired rotational position of the valve element or (ii) a setpoint value for a coolant temperature of a coolant, wherein the coolant temperature is achieved by maintaining the hollow valve element substantially at the one intermediate position or (iii) a setpoint value for a coolant volumetric flow, wherein the coolant volumetric flow is achieved by maintaining the hollow valve substantially at the one intermediate position.

3. The thermostat valve according to claim 1, wherein limiting values are predefined in each case for switching the at least one actuator if the predefined setpoint value is exceeded or undershot in such a way that the two-point control which is carried out by way of the two-point control device is effected with hysteresis.

4. A thermostat valve for a coolant circuit, comprising:
a housing with a plurality of coolant connectors, and wherein the coolant connectors connect the housing to the coolant circuit;
a hollow valve element mounted in the housing for rotation about a rotational axis, the hollow valve element having at least one opening on a circumferential face of the hollow valve element, wherein the at least one opening is selectively connectable to one or more of the coolant connectors of the housing by way of rotation of the hollow valve element in order to control flow along the coolant circuit;
a drive mechanism for rotating the hollow valve element about the rotational axis, wherein the drive mechanism includes an actuator, wherein the actuator is a pneumatic actuator or an electromagnetic actuator, wherein the actuator is switchable between a first switching state to rotate the hollow valve element in a first rotational direction toward a first end position and a second switching state to rotate the hollow valve element in a second rotational direction toward a second end position, the second rotational direction being opposite the first rotational direction;
a damper connected to damp the rotational movement of the hollow valve element by the drive mechanism, wherein the damper comprises a displacement damper to which the actuator is connected;
a two-point control device associated with the drive mechanism to enable the hollow valve element to be maintained substantially at a desired intermediate position from among multiple intermediate positions between the first end position and the second end position by repeatedly switching the actuator between the first switching state and the second switching state based upon a predefined setpoint value of the two-point control device that corresponds to the desired intermediate position, wherein the two-point control device actuates the actuator in such a way that, if the predefined setpoint value is exceeded, the actuator is switched from the first switching state into the second switching state and, if the predefined setpoint value is undershot, the actuator is switched from the second switching state into the first switching state, resulting in an oscillating rotational movement of the hollow valve element about the desired intermediate position without moving the hollow valve element to either the first end position or the second end position;
wherein the damper damps the rotational movement of the hollow valve element in order to increase time intervals between switching operations of the actuator between the first and second switching states, as compared to switching that would occur in absence of the damper, so as to facilitate maintaining the hollow valve element substantially at the desired intermediate position.

5. A thermostat valve for a coolant circuit, comprising:
a housing with a plurality of coolant connectors, and wherein the coolant connectors connect the housing to the coolant circuit;
a hollow valve element mounted in the housing for rotation about a rotational axis, the hollow valve element having at least one opening on a circumferential face of the hollow valve element, wherein the at least one opening is selectively connectable to one or more of the coolant connectors of the housing by way of rotation of the hollow valve element in order to control flow along the coolant circuit;
a drive mechanism for rotating the hollow valve element about the rotational axis, wherein the drive mechanism includes an actuator, wherein the actuator is a pneumatic actuator or an electromagnetic actuator, wherein the actuator is switchable between a first switching state to rotate the hollow valve element in a first rotational direction toward a first end position and a second switching state to rotate the hollow valve element in a second rotational direction toward a second end position, the second rotational direction being opposite the first rotational direction;
a damper connected to damp the rotational movement of the hollow valve element by the drive mechanism;
a two-point control device associated with the drive mechanism to enable the hollow valve element to be maintained substantially at a desired intermediate position from among multiple intermediate positions between the first end position and the second end position by repeatedly switching the actuator between the first switching state and the second switching state based upon a predefined setpoint value of the two-point control device that corresponds to the desired intermediate position, wherein the two-point control device actuates the actuator in such a way that, if the predefined setpoint value is exceeded, the actuator is switched from the first switching state into the second switching state and, if the predefined setpoint value is undershot, the actuator is switched from the second switching state into the first switching state, resulting in an oscillating rotational movement of the hollow valve element about the desired intermediate position;
wherein the damper damps the rotational movement of the hollow valve element in order to facilitate maintaining the hollow valve element substantially at the desired intermediate position.

* * * * *